(No Model.) 2 Sheets—Sheet 1.
M. W. LOWINSKY.
WHEEL FOR VEHICLES.

No. 495,817. Patented Apr. 18, 1893.

(No Model.) 2 Sheets—Sheet 2.

M. W. LOWINSKY.
WHEEL FOR VEHICLES.

No. 495,817. Patented Apr. 18, 1893.

UNITED STATES PATENT OFFICE.

MARCUS WILLIAM LOWINSKY, OF LONDON, ENGLAND.

WHEEL FOR VEHICLES.

SPECIFICATION forming part of Letters Patent No. 495,817, dated April 18, 1893.

Application filed September 29, 1892. Serial No. 447,262. (No model.)

*To all whom it may concern:*

Be it known that I, MARCUS WILLIAM LOWINSKY, engineer, a subject of the Queen of Great Britain, residing at London, England, have invented new and useful Improvements in Wheels for Vehicles, of which the following is a specification.

My invention relates to wheels for carts, carriages and other vehicles, and is designed to improve the construction and increase the strength and at the same time reduce the cost of manufacture of wooden wheels of that kind or class wherein the spokes are made with tenons which are inserted in mortises formed in the nave or hub of the wheel. By my invention I greatly diminish the number of mortises required in the nave or hub, without reducing the number of spokes in the wheel; moreover, by reason of the peculiar construction of my improved wheel, I can advantageously make the spokes with round tenons and form round holes instead of square or oblong mortises in the nave or hub. I thus increase the strength of the nave or hub in proportion to its size, and, at the same time, diminish the cost of manufacture of the wheel. According to my said invention, I make a wheel with pairs of spokes, each pair being formed integral with each other and with a single tenon, the tenon of each pair or set of spokes being fitted tightly into a single hole or mortise in the nave or hub of the wheel, and the outer ends of the spokes being fitted into the felly of the wheel in the usual or any other convenient manner.

In the accompanying drawings I have shown how my said invention may be conveniently and advantageously carried into practice.

Figure 1:
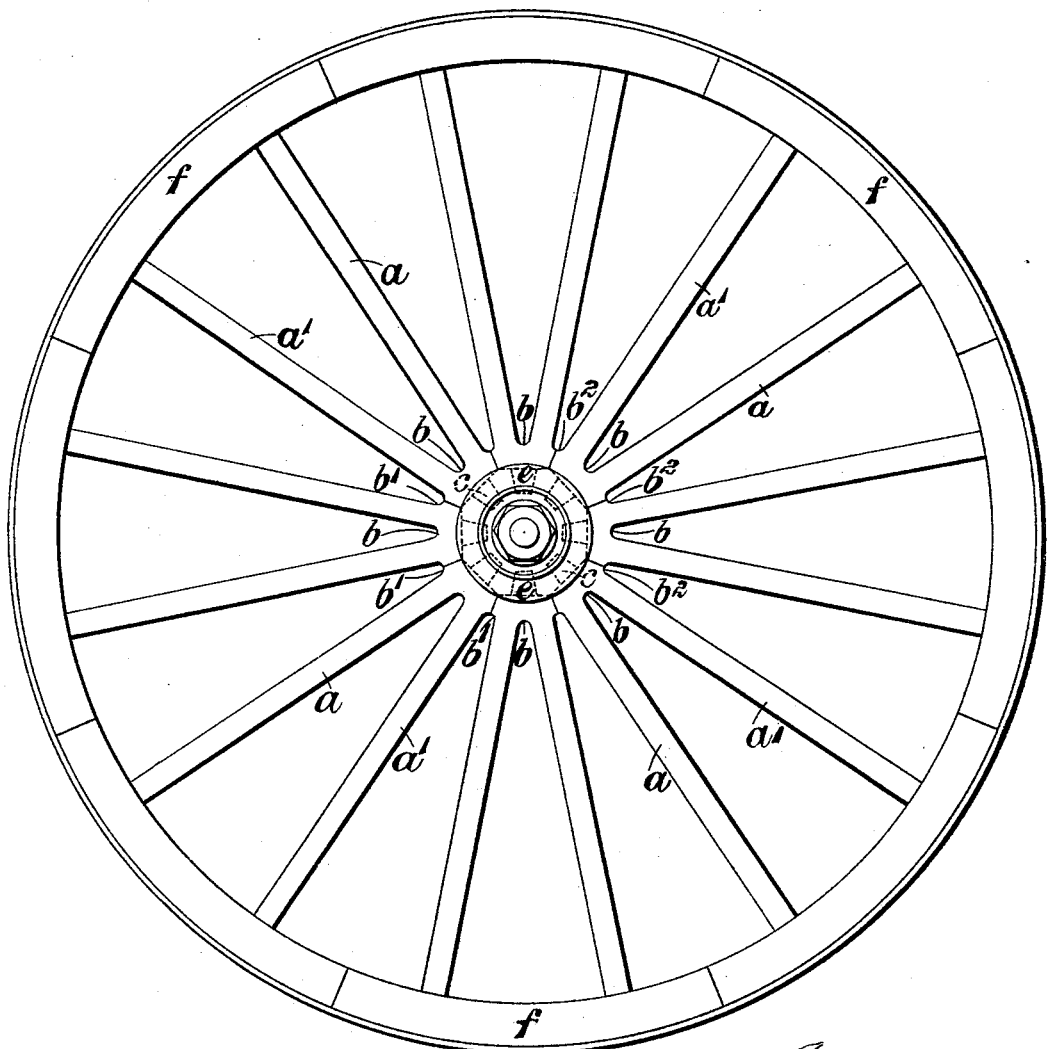
Figure 2:
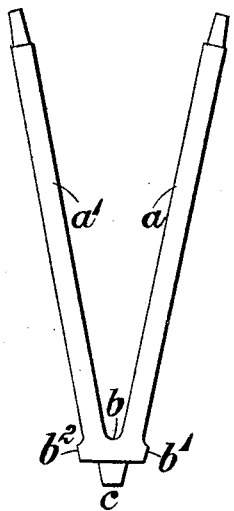

Figure 1 is a side elevation of a wheel constructed in accordance with my said invention. Fig. 2 is a side elevation of a pair of spokes combined with a single tenon, the said spokes and tenon being made in a single piece, and Fig. 3 is a sectional elevation, drawn to an enlarged scale, of the nave or hub of my improved wheel, showing how the pairs of spokes are secured in the said nave or hub.

Like letters indicate corresponding parts throughout the drawings.

Figure 3:
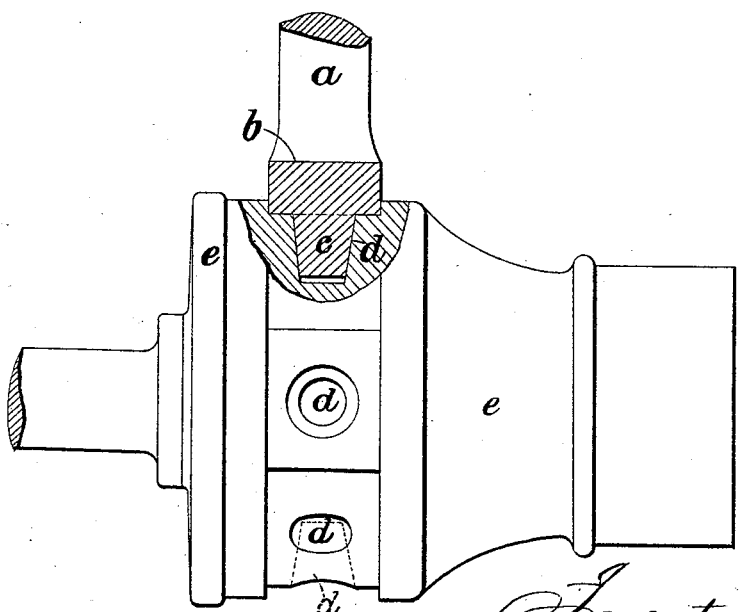

Referring to Figs. 1, 2 and 3, $a, a'$, indicate a pair of spokes united at their inner end $b$ and formed, out of a single piece of wood, together with a tenon $c$ which is secured in a hole or mortise $d$ in the nave or hub $e$. The outer ends of the spokes $a, a'$ are secured in the felly $f$ of the wheel in any well known or suitable manner.

The wheel shown in Fig. 1 is constructed with eight pairs of spokes each of which is combined with a single tenon. It is evident, however, that I can make my improved wheels with any other desired number of pairs or sets of spokes each combined with a single tenon.

With some kinds of wood, it is desirable that the spokes should be so made therefrom that the grain of the wood shall extend from end to end of the said spokes instead of diagonally across the same as would be the case if the combined spokes and tenon were cut out of a single piece of wood as shown in Figs. 1, 2 and 3. I take a piece of wood of the required length and of a breadth equal to, or slightly greater than twice the thickness of a single spoke, and I cut or split this piece of wood throughout nearly the whole length thereof, leaving an undivided or uniting piece at the inner end of the spokes; then bend the wood at or near the undivided end by any well-known method, so as to draw the two spokes apart at their outer end and set them at the required angle to each other. I thus insure that the grain of the wood shall extend longitudinally along, instead of diagonally across each spoke. I then shape or finish the shaping of the spokes and tenon as required.

I find it advantageous, in some cases, to make each pair or set of spokes with projections $b', b^2$, Figs. 1 and 2, at the inner end thereof, so that, when the wheel is built up, the projection $b'$ of each pair or set of spokes will abut against the projection $b^2$ of the adjacent pair or set of spokes, thus augmenting the strength and rigidity of the wheel.

By constructing a wheel with the spokes made in pairs each pair formed integral with a single tenon, as above described, I am enabled, if desired, to make the said wheel with a lighter nave or hub than is usually employed, as, by reason of the small number of holes or mortises required in the nave or hub of my improved wheel, the said nave or hub can be made shorter and of smaller diameter than the naves or hubs of the wheels hitherto constructed, without diminishing its strength as compared with the latter.

My said invention affords the further advantage that the tenons, instead of being made square or oblong in transverse section as heretofore, can be made of cylindrical or conical form without rendering them liable to turn in the nave or hub of the wheel, such turning of the spokes being prevented by the outer ends of the spokes of each pair or set being held in the felly of the wheel.

What I claim is—

1. A wheel, consisting of a hub, a rim or felly, and pairs of spokes, each pair of spokes being formed integral with each other and with a single tenon, substantially as described.

2. The combination with a hub, and a rim or felly, of spokes formed in pairs, each pair being composed of a single piece of material cut or split to form two members which are spread apart, leaving an undivided or uniting portion at the inner end which is formed integral with a single tenon, substantially as described.

MARCUS WILLIAM LOWINSKY.

Witnesses:
JOHN T. KNOWLES,
H. W. LYNDEN.